United States Patent
Johnson et al.

(10) Patent No.: US 10,843,449 B2
(45) Date of Patent: Nov. 24, 2020

(54) METHOD AND APPARATUS FOR FORMING COMPOSITE PLIES ON CONTOURED TOOL SURFACES

(71) Applicant: The Boeing Company, Chicago, IL (US)

(72) Inventors: Brice A. Johnson, Federal Way, WA (US); Michael Robert Anderson, Renton, WA (US); Kurtis Shuldberg Willden, Kent, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 15/841,432

(22) Filed: Dec. 14, 2017

(65) Prior Publication Data

US 2019/0184693 A1   Jun. 20, 2019

(51) Int. Cl.
*B32B 38/18* (2006.01)
*B32B 37/10* (2006.01)
*B29C 70/38* (2006.01)
*B29C 70/56* (2006.01)

(52) U.S. Cl.
CPC .......... *B32B 38/1858* (2013.01); *B29C 70/38* (2013.01); *B29C 70/56* (2013.01); *B32B 37/1018* (2013.01); *B32B 38/18* (2013.01); *B32B 38/1866* (2013.01); *B32B 2605/18* (2013.01)

(58) Field of Classification Search
CPC . B29C 70/44; B29C 70/443; B29C 66/82423; B29C 66/8242; B30B 5/02; B30B 9/22; B32B 37/10; B32B 37/1009; B32B 37/1018; B32B 38/1858; B25J 15/0616; B23B 31/307
See application file for complete search history.

(56) References Cited

U.S. PATENT DOCUMENTS

| | | |
|---|---|---|
| 7,341,086 B2 | 3/2008 | Nelson et al. |
| 8,551,380 B2 | 10/2013 | Hawkins et al. |
| 8,752,293 B2 | 6/2014 | Jones et al. |
| 8,936,695 B2 | 1/2015 | Rotter et al. |
| 9,314,974 B2 | 4/2016 | Buttrick et al. |
| 9,387,657 B2 | 7/2016 | Smith, Jr. et al. |
| 9,586,344 B2 | 3/2017 | Thomas et al. |

(Continued)

FOREIGN PATENT DOCUMENTS

| | | |
|---|---|---|
| DE | 102016207188 A1 | 11/2017 |
| EP | 2266785 A1 | 12/2010 |

(Continued)

OTHER PUBLICATIONS

Machine tranlsation of DE 102016207188.*

(Continued)

*Primary Examiner* — Christopher T Schatz
(74) *Attorney, Agent, or Firm* — Yee & Associates, P.C.

(57) ABSTRACT

An end effector transports, places and forms a composite ply on a tool having complex tool surfaces. The end effector includes a combination of vacuum and Bernoulli grippers for holding the composite ply while it is being transported and formed, and a set of mechanical actuators that form the composite ply down over the tool surfaces. The Bernoulli grippers allow the composite ply to slip while being held and formed.

20 Claims, 13 Drawing Sheets

(56) References Cited

U.S. PATENT DOCUMENTS

| | | |
|---|---|---|
| 9,636,876 B2 | 5/2017 | Lee et al. |
| 9,663,247 B2 | 5/2017 | Rotter et al. |
| 9,701,067 B2 | 7/2017 | Hawkins et al. |
| 9,782,937 B1 | 10/2017 | Modin et al. |
| 2010/0011580 A1 | 1/2010 | Brennan et al. |
| 2012/0330453 A1 | 12/2012 | Samak Sangari et al. |
| 2014/0090528 A1 | 4/2014 | Graf |
| 2015/0352795 A1 | 12/2015 | Coxon et al. |
| 2016/0263842 A1 | 9/2016 | Rotter et al. |
| 2016/0368226 A1 | 12/2016 | Encinosa et al. |

FOREIGN PATENT DOCUMENTS

| | | |
|---|---|---|
| WO | WO2014035579 A1 | 3/2014 |
| WO | WO2017005770 A1 | 1/2017 |

OTHER PUBLICATIONS

European Patent Office Extended Search Report, dated Apr. 24, 2019, regarding Application No. 18197767.9, 8 pages.
GCC Patent Office Examination Report and English translation, dated Apr. 28, 2020, regarding Application No. GC2018-36632, 6 pages.

\* cited by examiner

METHOD AND APPARATUS FOR FORMING COMPOSITE PLIES ON CONTOURED TOOL SURFACES

BACKGROUND INFORMATION

1. Field

The present disclosure generally relates to fabrication of composite structures, and deals more particularly with forming composite plies on tool surfaces having complex contours.

2. Background

Composite laminate structures having highly contoured surfaces can present challenges during fabrication, particularly in high production rate environments. During layup of the structure, composite plies must be individually laid up and swept down over tool surfaces having complex contours without bunching or wrinkling. Automated pick-and-place equipment has been developed to partially automate the layup process but have limited forming capability. More advanced automated layup/forming equipment has been also developed that employ complex actuators and control systems. However, this equipment also has limited forming capability and may not be capable of conforming plies to complex tool surfaces that require significant ply shearing.

Accordingly, it would be desirable to provide a cost-effective, highly efficient apparatus and method for transporting and forming plies over tool surfaces having complex contours.

SUMMARY

The disclosure relates in general to the fabrication of composite laminate structures, and more specifically to automated equipment and methods for transporting and forming composite plies over tool surfaces having complex contours. The equipment includes a fully automated end effector configured to be mounted on a robotic or other type of manipulator. The end effector is capable of lifting a ply of composite material such as prepreg, transporting the composite ply to a forming tool such as a mandrel, locating and clamping the composite ply on the tool, and then forming composite ply down over complex surface contours on the tool. The end effector grips and lifts the composite ply using a vacuum suction cup and Bernoulli cups, in combination with a flexible forming membrane. Actuators on the end effector stretch and pull the forming membrane as needed to form the composite ply down onto and over the tool surfaces. During forming, the forming membrane and composite ply slip beneath the Bernoulli cups to prevent gathering or wrinkling of the composite ply. The stiffness of the forming membrane may be locally tailored using reinforcements in order to provide optimal forming characteristics.

One of the advantages of the disclosed embodiments is that the process of picking up, transporting, placing, and forming plies is fully automated. Another advantage is that the end effector is relatively simple in construction and is cost-effective. A further advantage is that plies of composite material such as prepreg can be formed over complex tool surfaces, including closed contours.

According to one aspect, an end effector is provided for transporting and forming a composite ply onto a contoured tool surface. The end effector includes at least one vacuum gripper configured to grip the composite ply. At least one Bernoulli gripper is provided which is configured to also grip the composite ply while allowing it to slip relative to the Bernoulli gripper as the composite ply is being formed. The end effector further includes a forming membrane configured to be placed over the composite ply, and a forming device for engaging and forming the forming membrane and composite ply down onto the contoured tool surface.

According to another aspect, apparatus is provided for placing and forming a composite ply onto a contoured tool surface. The apparatus includes a manipulator and a frame that is mounted on and transportable by the manipulator. The apparatus also includes a flexible forming membrane supported by the frame that is configured to be placed over the contoured tool surface. At least one vacuum suction cup is mounted on the flexible forming member and is configured to engage and grip the composite ply, thereby fixing the position of the composite ply on the frame. A clamping device on the frame is configured to clamp a section of a flexible forming membrane and the composite ply on the contoured tool surface. A plurality of Bernoulli cups are mounted on the flexible forming membrane and are configured to grip the composite ply while allowing it to slip therebeneath as the ply is being formed onto the contoured tool surface. The apparatus also includes a plurality of forming devices mounted on the frame that are configured to form the flexible forming membrane and the composite ply down onto the contoured tool surface.

According to still another aspect, a method is provided of transporting and forming a composite ply onto a contoured tool surface. The method includes gripping the composite ply using a plurality of gripping cups on an end effector that is configured to be mounted on a manipulator. The method includes transporting the composite ply to the contoured tool surface using the end effector, and placing the composite ply on the contoured tool surface using the end effector. The method further includes placing a forming membrane over the composite ply on the contoured tool surface using the end effector. The method also includes clamping a section of the forming membrane and the composite ply against the contoured tool surface, and then forming the composite ply down over the contoured tool surface while the section of a composite ply remains clamped against the contoured tool surface. During forming of the composite ply, the composite ply is allowed to slip relative to at least certain of the gripping cups.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
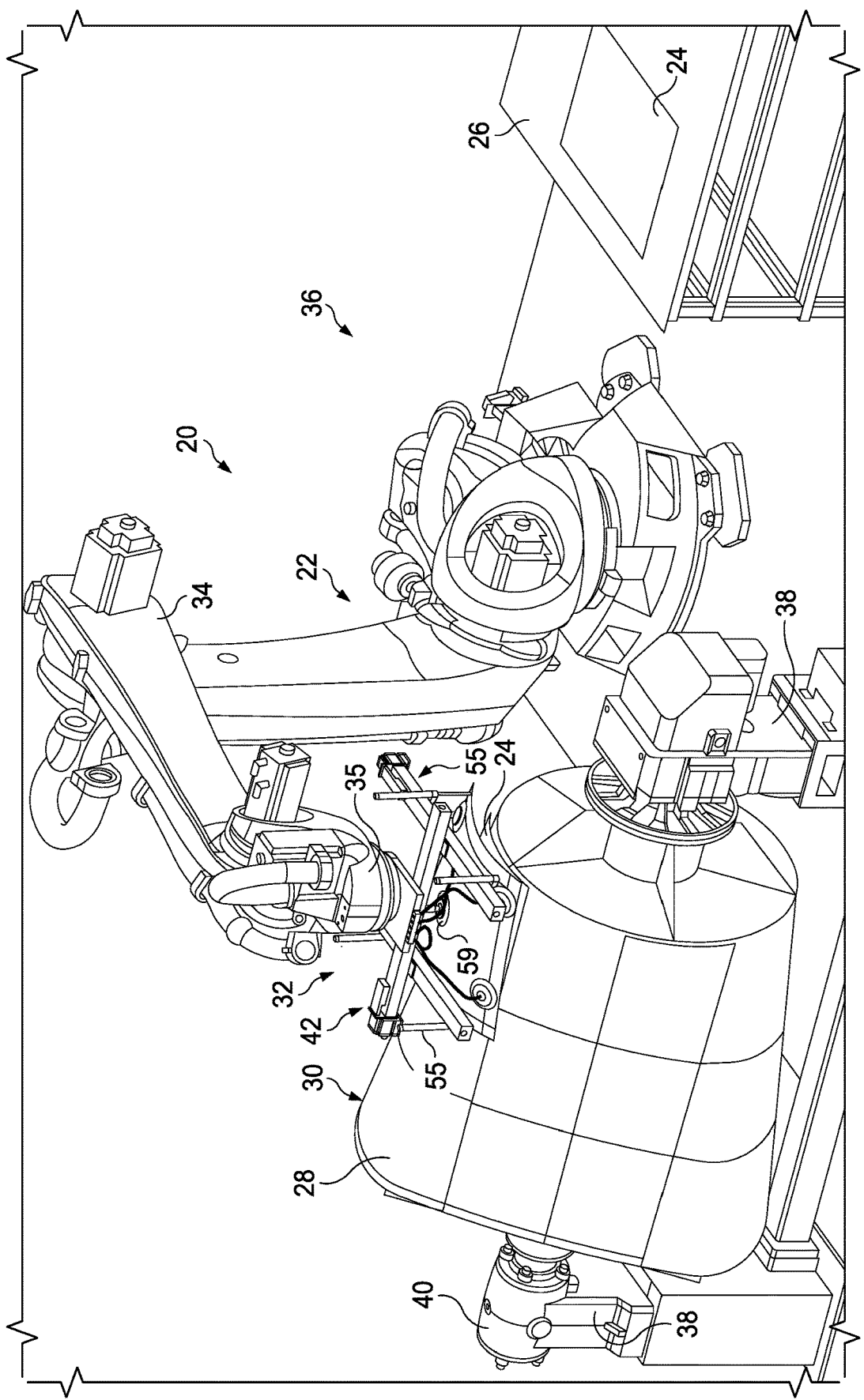
FIG. 1 is an illustration of a perspective view of apparatus for transporting and forming composite plies on a contoured tool surface, showing an end effector placing a composite ply on the tool.
Figure 2:
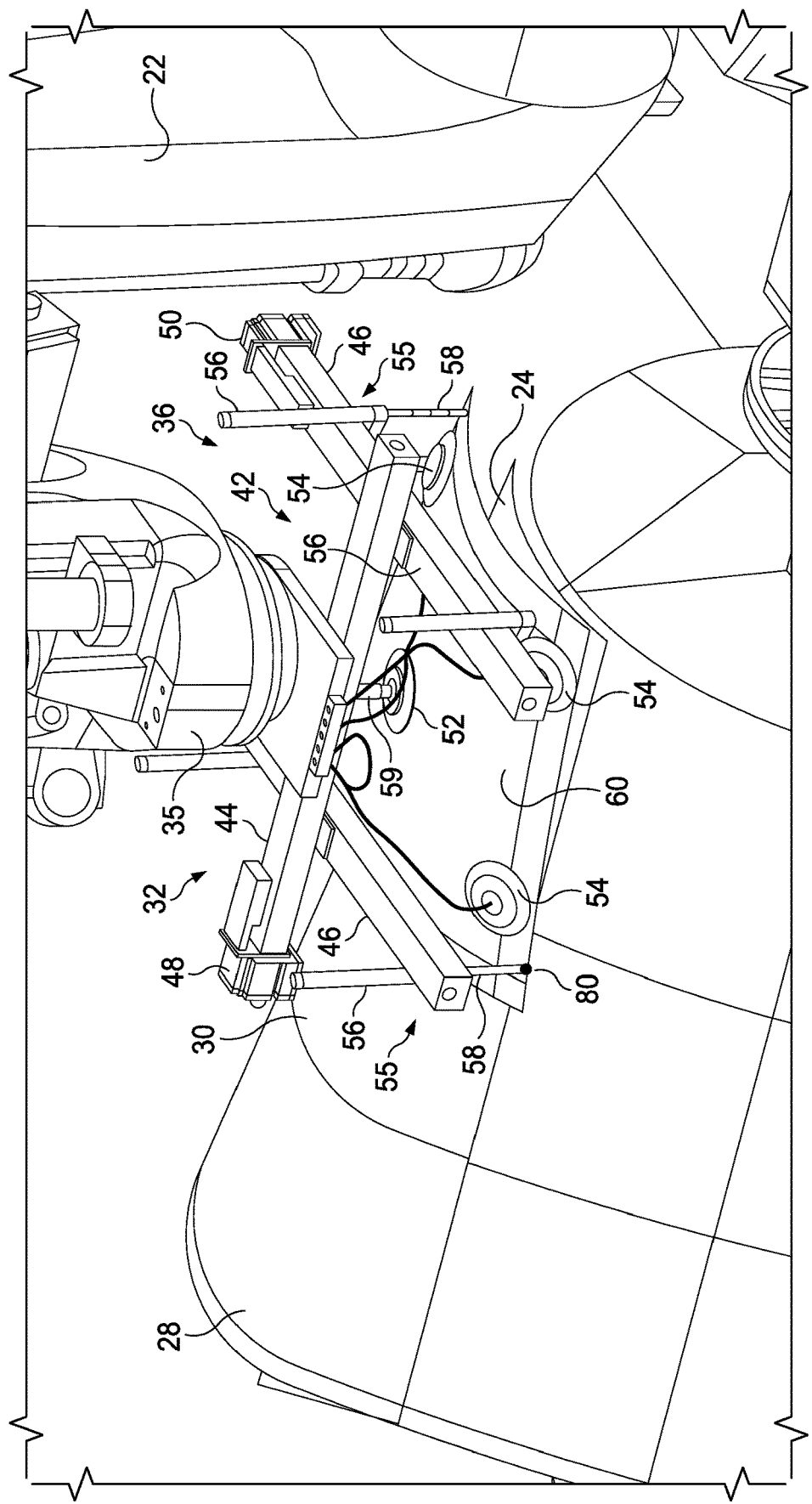
FIG. 2 is an illustration of the end effector shown in FIG. 1.
Figure 3:
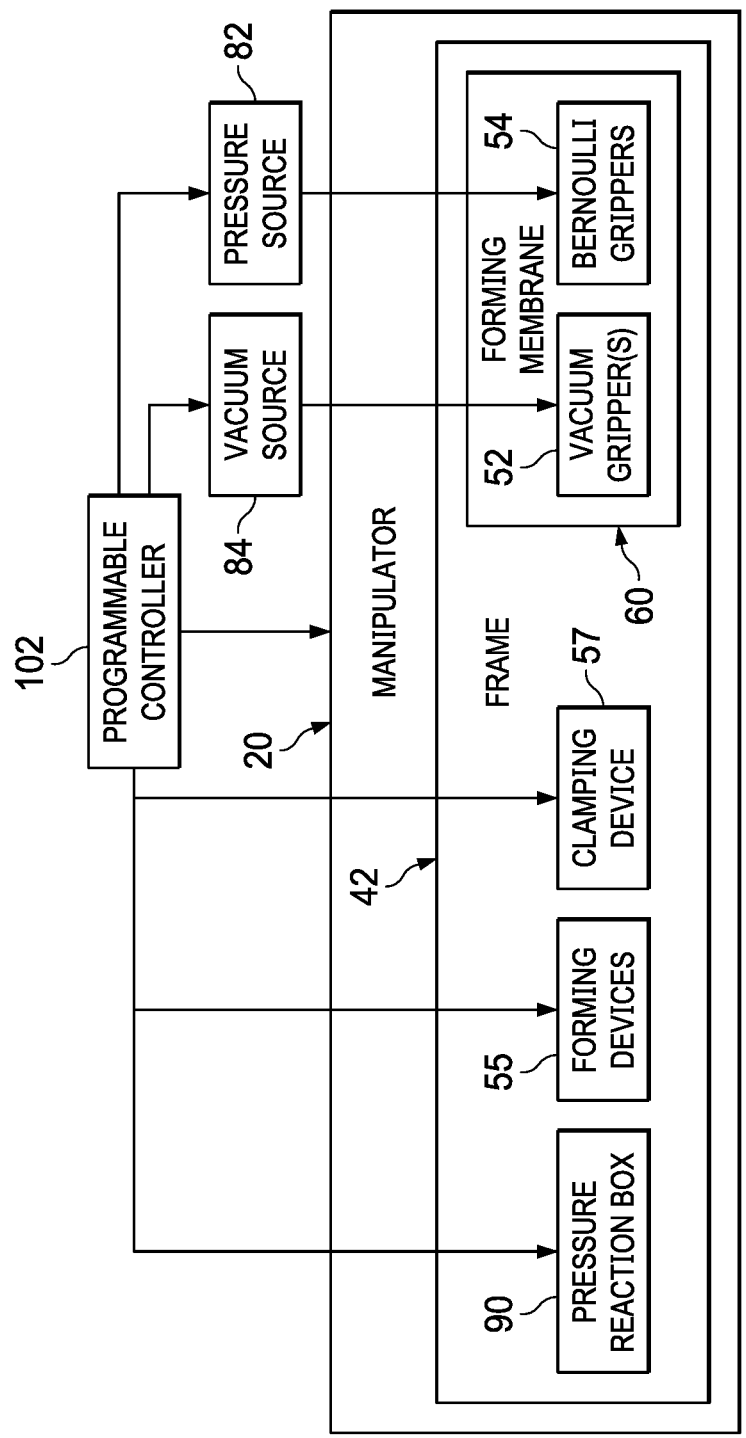
FIG. 3 is an illustration of a block diagram of the apparatus.

FIGS. 1-3 illustrates an apparatus 36 for transporting and forming a flat composite ply 24 such as prepreg sheet onto a contoured tool surface 30 of a tool 28 or similar mandrel. In the illustrated example, the tool 28 is mounted on a rotary stand 29 comprising supports 38 for rotation by a motor 40, however other forms of tools with complex surface contours, as well as other forms of tool mounting arrangements are possible. The apparatus 36 broadly comprises a manipulator 20 such as, without limitation, an articulated robot 22, an end effector 32, and a programmable controller 102 (FIG. 3) such as a PLC (programmable logic controller) or PC (personal computer), which automatically controls operation of the articulated robot 22 and the end effector 32. Although transporting and forming a single composite ply 24 is illustrated, the end effector 32 may be employed to transport and form a group or stack of plies to a desired contour.

The end effector 32 includes an adjustable frame 42 mounted on the wrist 35 of an arm 34 of the articulated robot 22. The frame 42 includes a backbone on which there is mounted a pair of laterally spaced cross members 46. Electric, pneumatic or hydraulic motors 48, 50 and associated drives (not shown) may be provided to adjust the linear position of the backbone 44 on the wrist 35, and the lateral positions of the cross members 46 in order to suit the size and shape of the composite ply 24. However, a variety of other frame configurations are possible, depending on the application. Moreover, in other embodiments, the functional elements of the end effector 32 described below may be arranged and mounted on the end effector 32 without use of a frame. The end effector 32 further includes a flexible forming membrane 60 mounted on the frame 42 having a desired stiffness and the ability to stretch during forming. The forming membrane 60 assists in transporting and placing the composite ply 24, and forming it down onto the contoured tool surface 30. The forming membrane 60 may comprise, for example and without limitation, a stretchable woven or knitted fabric or an elastomeric material that may be locally permeable to air. The stiffness of the forming membrane 60 may be locally tailored over its area to best suit a particular tool surface geometry in order to optimize composite ply forming.

The end effector 32 further includes one or more vacuum grippers 52 and a plurality of spaced apart Bernoulli grippers 54 that are attached to the forming membrane 60. The vacuum grippers 52 and Bernoulli grippers function to grip and hold the composite ply 24 against the forming membrane 60 as the composite 24 is being picked up, transported and placed on the tool 28. The vacuum gripper 52 fixes and maintains the position of the composite ply 24 on the end effector 32, and may comprise a conventional vacuum suction cup that is coupled with a suitable vacuum source 84 (FIG. 3) which draws the composite ply 24 against the forming membrane 60 using vacuum force.

The vacuum gripper 52 is located substantially along the centerline of the forming membrane 60, while the Bernoulli grippers 54 are located along its opposite edges. The Bernoulli grippers 54 may comprise conventional Bernoulli cups that are coupled with a suitable pressure source 82 (FIG. 3) and develop a lifting force F (FIG. 4) using the well-known Bernoulli effect which lifts and holds the composite ply 24 beneath the forming membrane 60. As will be discussed below in more detail, the Bernoulli grippers 54 do not physically contact the composite ply 24 because the pressurized air stream escaping beneath the Bernoulli grippers 54 produces an air gap between the composite ply 24 and the Bernoulli grippers 54 which allows the composite ply 24 to slip or shift laterally beneath the Bernoulli grippers 54 during the composite ply forming process. In some embodiments, vacuum grippers may be employed in lieu of the Bernoulli grippers 54 to hold and form the ply 24.

The manipulator 20 further includes at least one clamping device 57 and one or more forming devices 55 carried on the frame 42. The clamping device 57 (see FIGS. 3 and 10) may comprise a mechanical actuator or similar mechanism provided with a clamping member 59. The clamping device 57 clamps a section of the forming membrane and the composite ply 24 against the tool 28 at an indexed location of the tool surface 30, and hold it in this location in preparation for the forming operation. In the illustrated example, the clamping device 57 engages and clamps the forming membrane 60 along its centerline, however depending upon the application, the forming membrane 60 may be clamped to the tool 28 at other locations. As shown in FIGS. 1 and 2, the clamping device 57 may be attached to the vacuum gripper 52, in which case the vacuum gripper 52 is used to clamp the forming membrane 60 against the tool 28.

Figure 12:
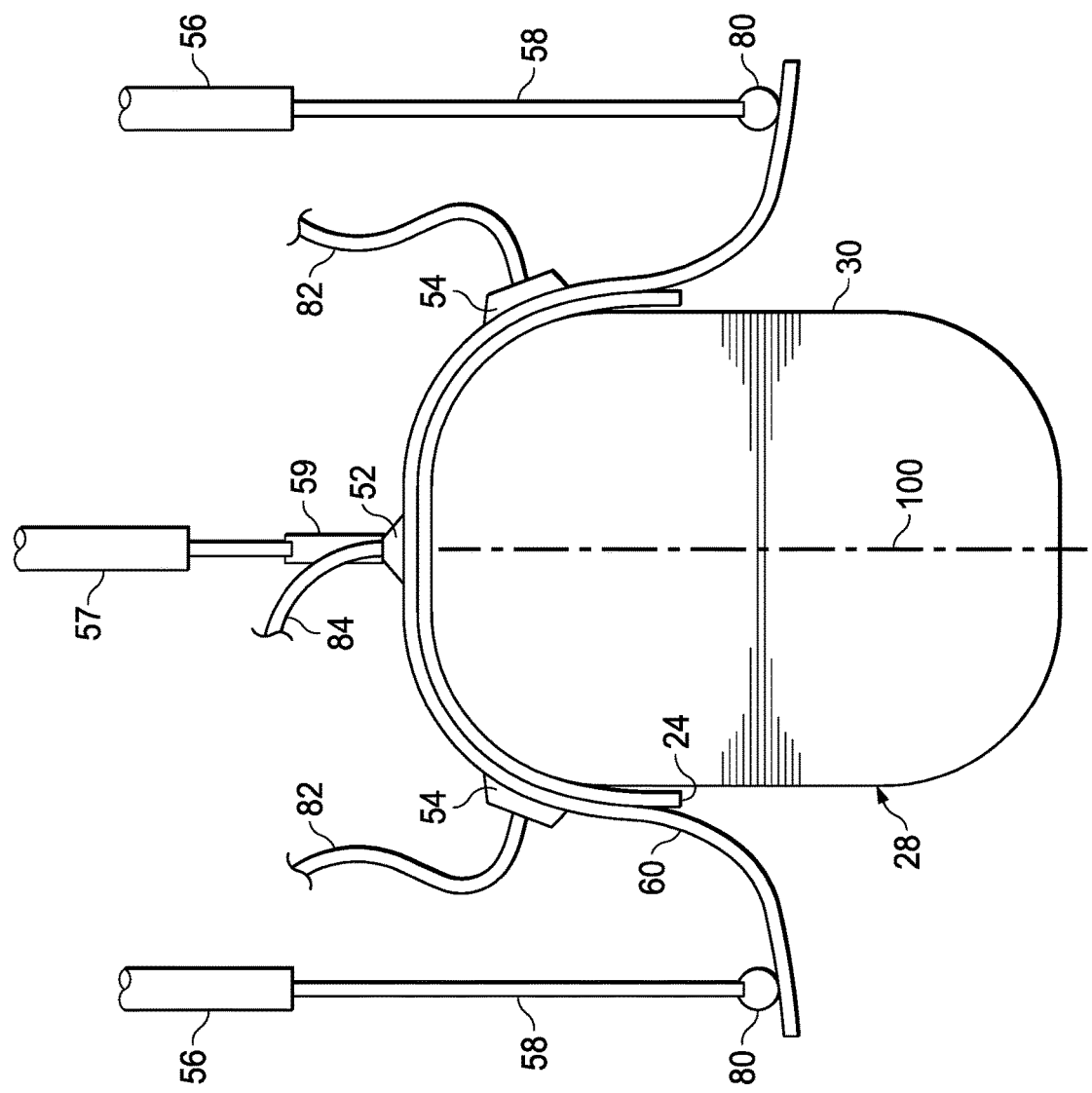
FIG. 12 is an illustration similar to FIG. 11, but showing the composite ply being formed down over the surface of the tool.

The forming devices 55 are respectively mounted on the cross members 46, aligned above two opposite edges of the forming membrane 60. Each of the forming devices 55 may comprise, for example and without limitation, an electrically, pneumatically, or hydraulically operated linear actuator having an extendable arm 58 provided with a forming member 80 at its outer extremity. The forming member 80 has a geometry that allows it to smoothly slide or roll over a portion of the surface of the forming membrane 60 during a forming operation. Forming members 80 may be formed of a low friction material or may comprise rollers. In some embodiments, the forming members 80 may be attached to the forming membrane 60 in order to form the forming membrane 60 and the ply 24 over the tool surface 30. As shown in FIGS. 3 and 12, optionally, a pressure reaction box 90 may be mounted on the frame 42 which functions to compact the composite ply 24 after it has been found formed down onto the tool 28.

Figure 4:
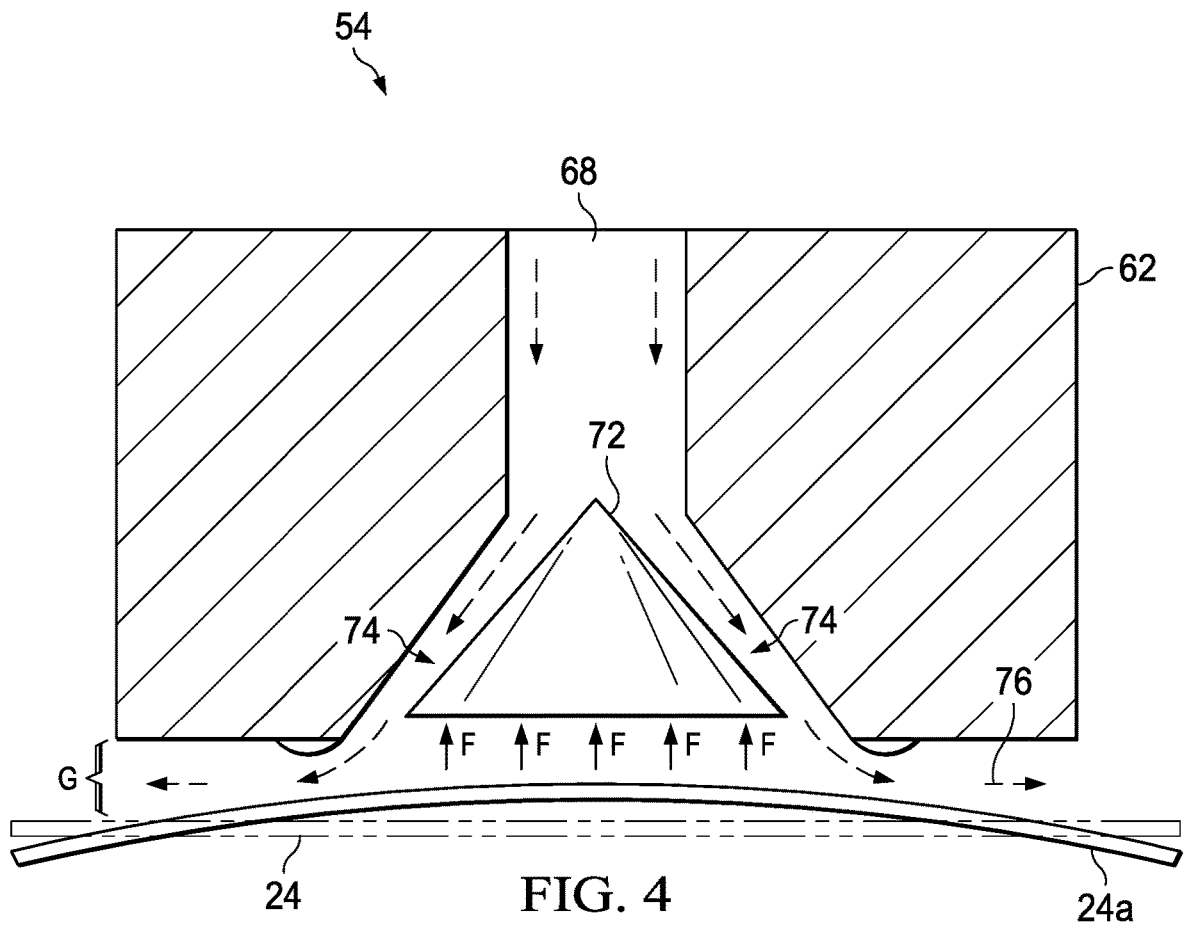
FIG. 4 is an illustration of a cross-sectional view of a Bernoulli cup gripping a composite ply, the forming membrane not shown for clarity.

FIG. 4 illustrates one suitable form of the Bernoulli grippers 54. In this embodiment, each of the Bernoulli grippers 54 comprises a Bernoulli cup body 62 having a central air inlet 68 coupled with the pressure source 82. An internal cone 72 forms an annular nozzle 74 at the bottom of the cup body 62. Air entering the inlet 68 exits the cup body 62 through the annular nozzle 74, and flows 76 in a fats moving air stream laterally outwardly through a gap G between the bottom of the cup body 62 and the composite ply 24. The lateral airflow 76, results in the production of a lifting force F which draws the composite ply 24 upwardly and holds it in suspension immediately beneath the cup body 62. During the composite ply forming process, described in more detail below, the composite ply 24 slips laterally beneath the Bernoulli grippers 54 due to the gap G, yet continues to be gripped by the Bernoulli gripper 54 even as the composite ply 24 deflects 24a while being onto the shape of the contoured tool surface 30. When the flow of pressurized air to the Bernoulli grippers 54 is terminated, the lifting force F is removed, releasing the composite ply 24.

Figure 5:
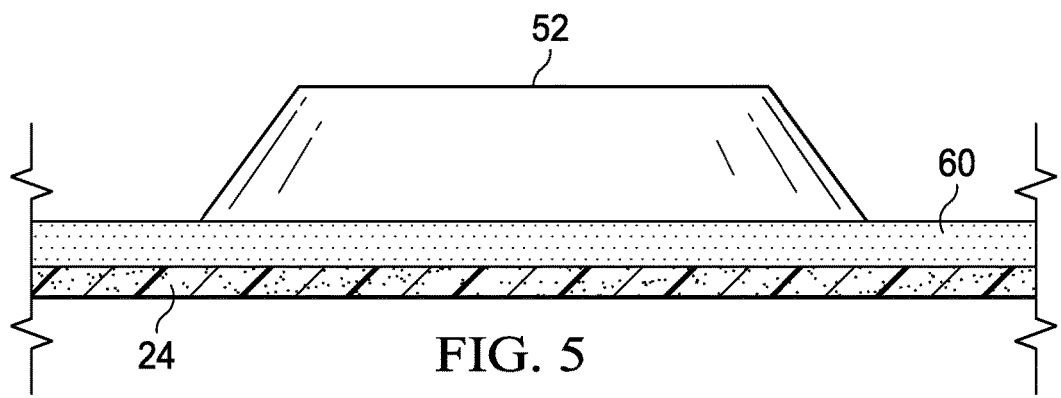
FIG. 5 is an illustration of a cross-sectional view of a vacuum suction cup mounted on the forming membrane and gripping a composite ply.

Referring to FIG. 5, the vacuum gripper 52 may be mounted on the surface of the forming membrane 60 using any suitable technique, such as by an adhesive. Alternately, the vacuum gripper 52 may be integral the membrane 60, as by insert molding or similar fabrication techniques.

Figure 6:
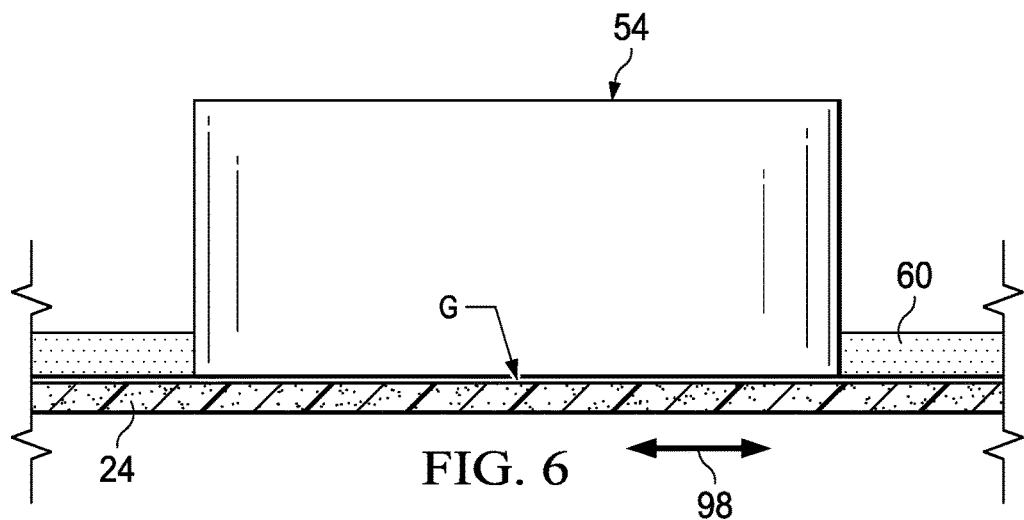
FIG. 6 is an illustration of a cross-sectional view of a Bernoulli cup mounted on the forming membrane and gripping the composite ply.

As shown in FIG. 6, each of the Bernoulli grippers 54 may be mounted on the forming membrane 60 by techniques similar to those used to mount the vacuum gripper 52. The Bernoulli grippers 54 are recessed within the forming membrane 60 such that their bottom surfaces are generally flush with the bottom surface of the forming membrane 60. As previously described, a gap G is present between the composite ply 24 and the bottom of the Bernoulli gripper 54 which allows the composite ply 24 to slip 98 beneath the Bernoulli grippers 54 during the composite ply forming process. In some embodiments, it may be necessary or desirable to also recess the vacuum gripper 52 within the forming membrane 60.

Figure 7:
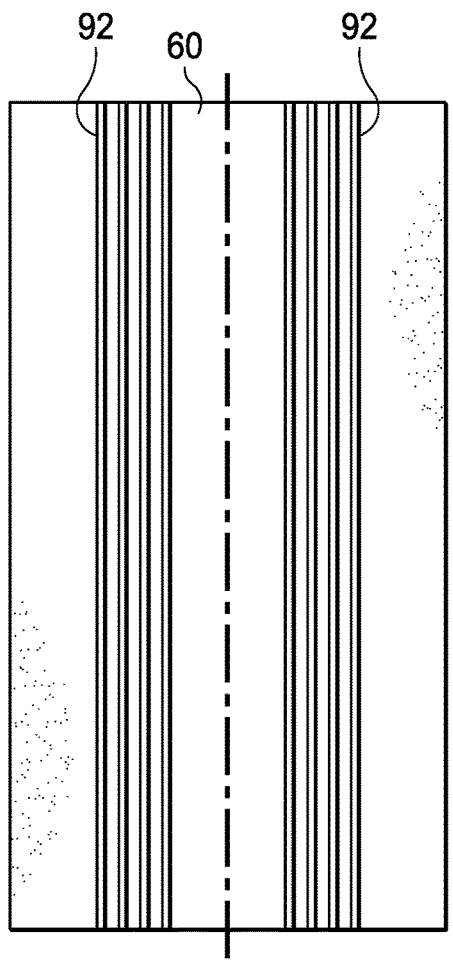
FIG. 7 is an illustration of a plan view of one embodiment of the forming membrane containing reinforcing batons.
Figure 8:
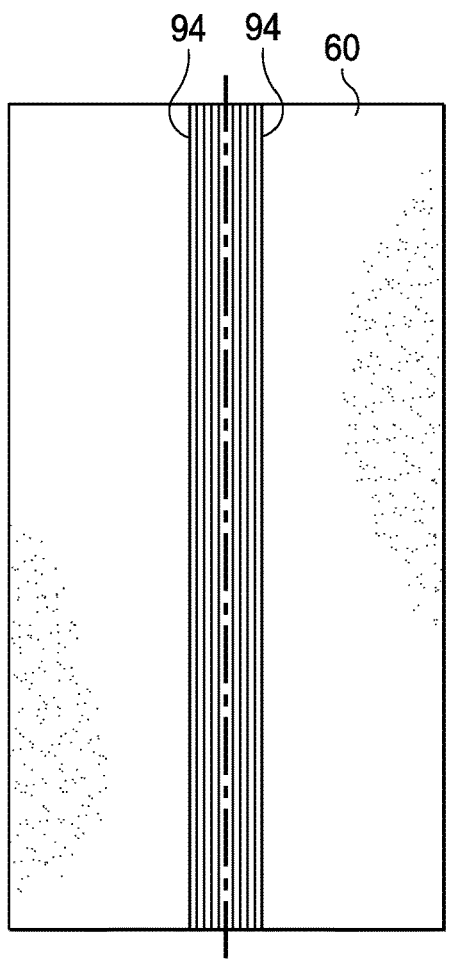
FIG. 8 is an illustration of a plan view of another embodiment of the forming membrane containing a centrally located flexible spline.
Figure 9:
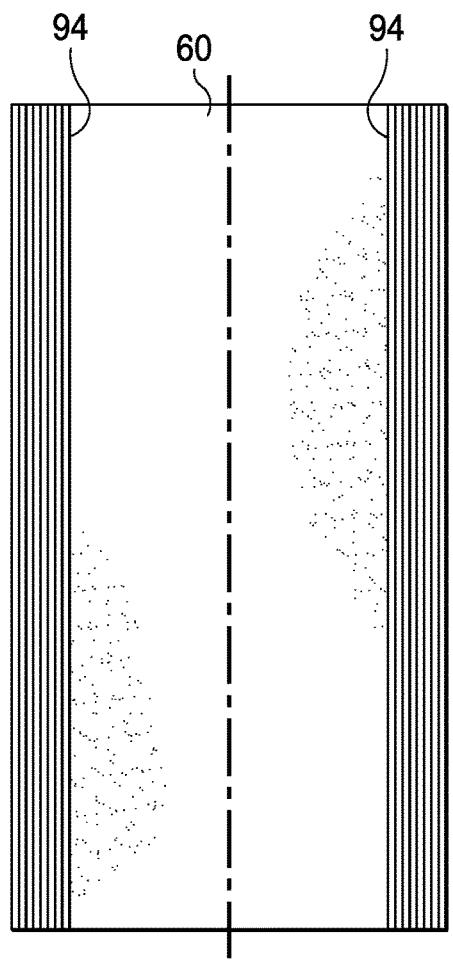
FIG. 9 is an illustration of a plan view of a further embodiment of the forming membrane containing flexible edge splines.

The forming membrane 60 may include local reinforcements resulting in a locally tailored stiffness that allows the forming membrane 60 to better conform to particular areas of the tool surface 30. For example, as shown in FIG. 7, batons 92 may be incorporated into the forming membrane 60, which in this example are positioned on opposite sides of the longitudinal centerline of the forming membrane 60. Similarly, certain areas of the forming membrane 60, such as along its centerline as shown in FIG. 8, or along the outer edges as shown in FIG. 9, may be provided with flexible splines 94 which reduce the stiffness of the forming membrane 60 in these areas.

Figure 10:
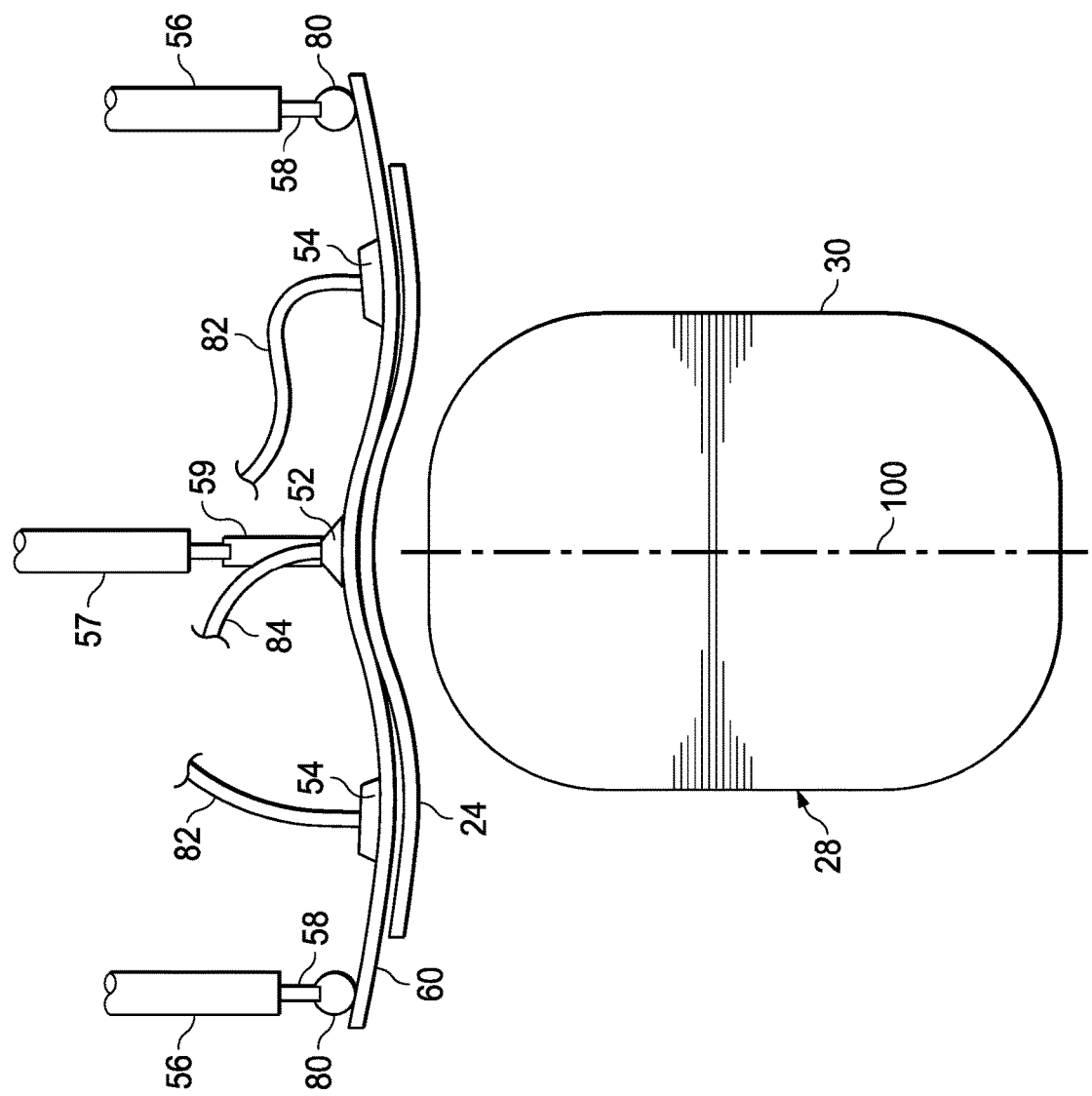
FIG. 10 is an illustration of a diagrammatic end view of the end effector positioned to place a composite ply on a tool.
Figure 11:
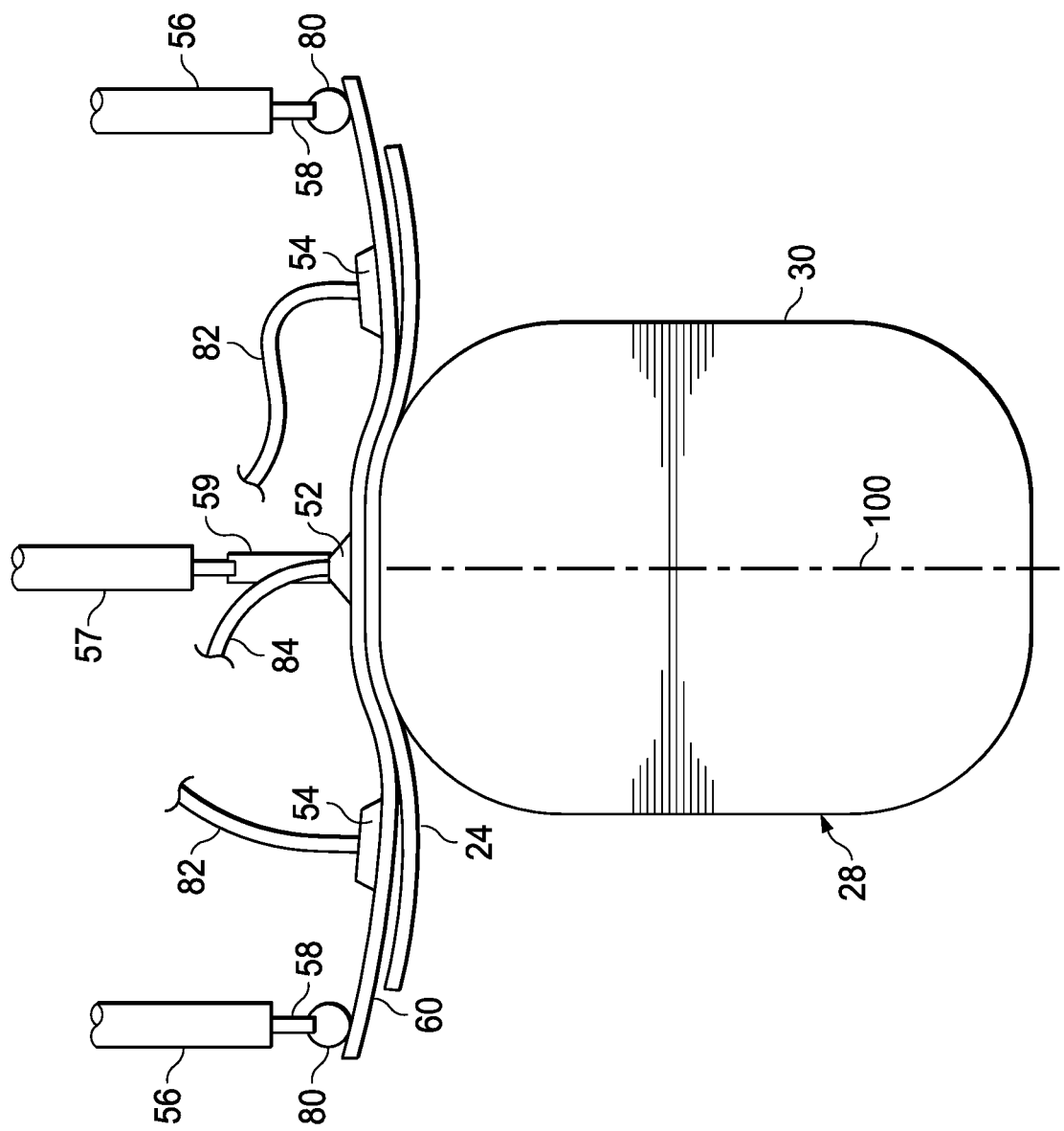
FIG. 11 is an illustration similar to FIG. 10, but showing the forming membrane and the composite ply having being clamped onto the surface of the tool.

Attention is now directed to FIGS. 10, 11 and which diagrammatically illustrate the sequence of placing, forming and compacting a composite ply 24 on a contoured tool surface 30 using the end effector 32 previously described. In these Figures, the outboard location of the mechanical actuators 56 from the centerline 100 of the tool 28 is exaggerated for clarity of illustration. In FIG. 10, the composite ply 24 has been previously picked up by the end effector 32 and moved to a location immediately above the tool 28, indexed with the tool centerline 100. Next, as shown in FIG. 11, the end effector 32 lowers the composite ply 24 onto the tool 28, and the clamping device 57 is actuated, causing the clamping member 59 to clamp the forming membrane 60 and the composite ply 24 on the tool 28. At this point, the middle of the composite ply 24 is held stationary at an indexed location on the tool surface 30, while the remaining areas of the composite ply 24 are held by but do not contact the Bernoulli grippers 54.

Figure 13:
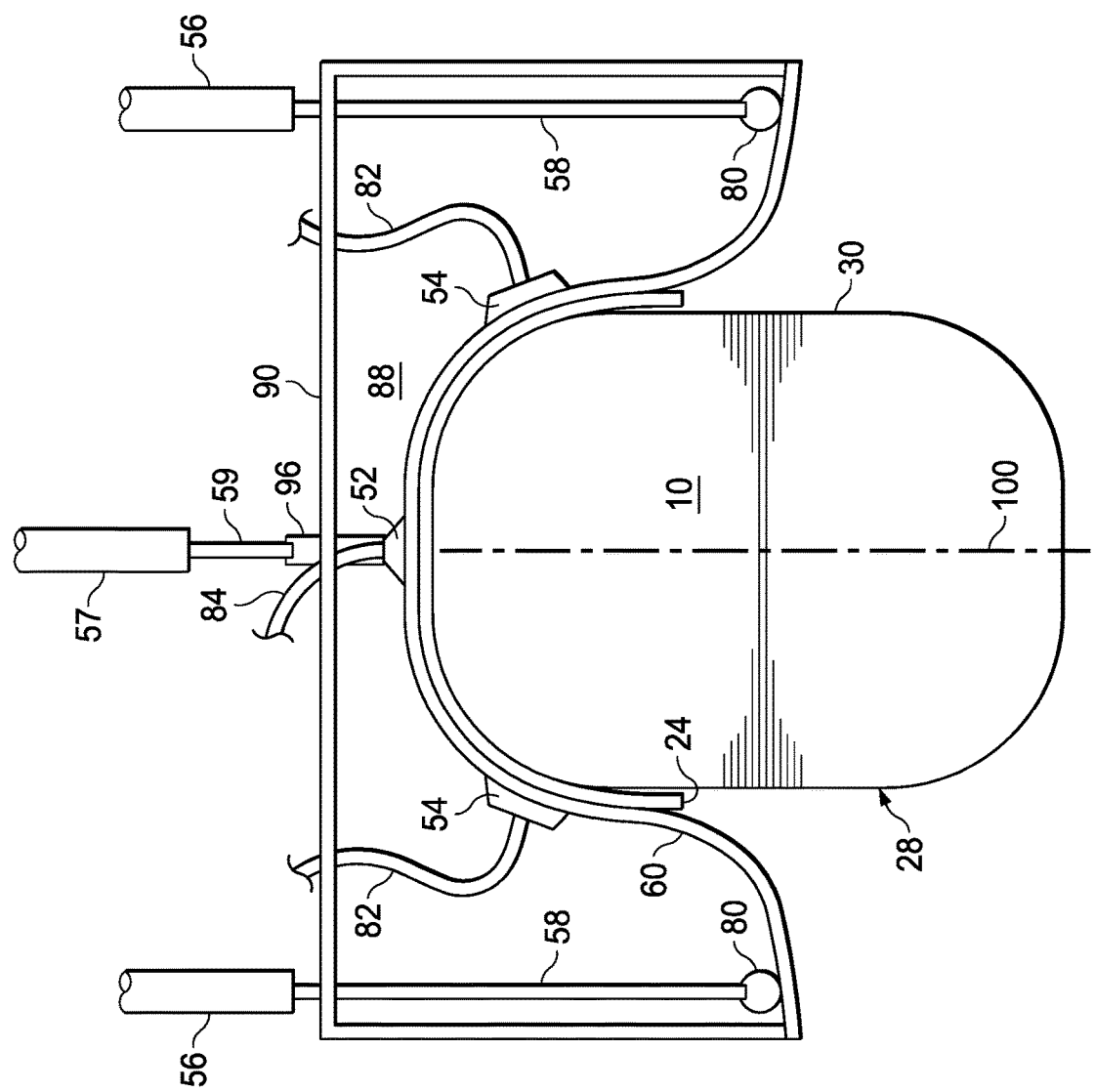
FIG. 13 is an illustration similar to FIG. 12, wherein an optional pressure reaction box has been installed around the composite ply in preparation for compacting the composite ply against the tool.

Referring to FIG. 12, with the middle of the composite ply 24 clamped against the tool surface 30, the mechanical actuators 56 are energized, extending the forming arms 58 and causing the forming members 80 to move into engagement with and sweep the forming membrane 60 along with the composite ply 24 down onto and across the tool surface 30. Depending upon the amount of compaction resulting from the composite ply forming process, further compaction of the composite ply 24 may be necessary or desirable. Thus, optionally, as shown in FIG. 13, a pressure reaction box 90 may be installed around the forming membrane 60 and composite ply 24. The interior 88 of the pressure reaction box 90 may be pressurized, for example using the pressure source 82 (FIG. 3), causing additional compaction force to be applied to the composite ply 24. In some embodiments, the pressure reaction box 90 may be mounted on and carried by the end effector 32. Following the forming/compaction of the composite ply 24, the forming arms 58 are retracted, vacuum is removed from the vacuum gripper 52 and pressure is removed from the Bernoulli grippers 54, allowing the forming membrane 60 be lifted away from the composite ply 24 by the end effector 32.

Although not shown in the Figures, a backing film extractor may be employed to remove a backing film from the composite ply 24 before additional plies 24 are laid up on the tool 28. The sequence described above is repeated in order to layup additional plies 24 according to a ply schedule suitable for the structure being fabricated. The tool 28 may be indexed as necessary in order to reorient it relative to the end effector. For example, referring to FIG. 1, the tool 28 may be rotated slightly to different indexed positions as additional plies 24 are subsequently being laid up.

Figure 14:
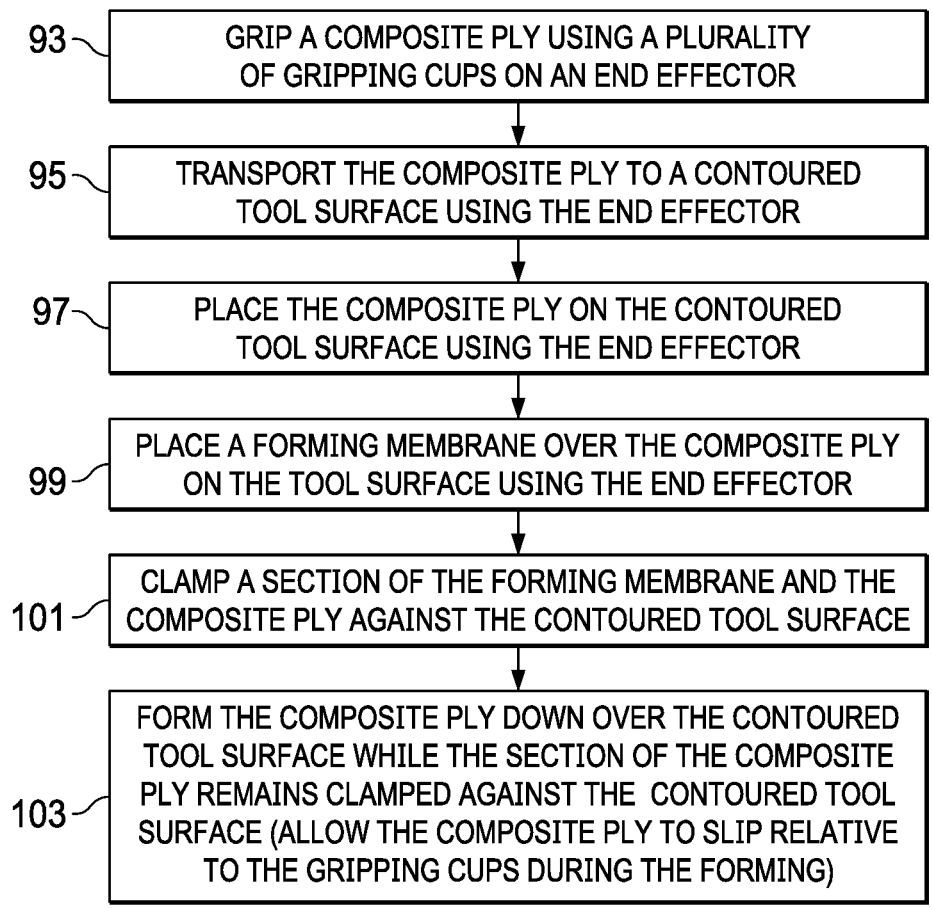
FIG. 14 is an illustration of a flow diagram of a method of placing and forming composite plies on a tool.

Attention is now directed to FIG. 14 which broadly illustrates the steps of a method of transporting and forming composite plies 24 on a contoured tool surface 30. Beginning at 93, a composite ply 24 is gripped using a plurality of gripping cups 52, 54 on an end effector 32. At 95, the composite ply 24 is transported to a contoured tool surface 30 using the end effector 32. At 97, the composite ply 24 is placed on the contoured tool surface 30 using the end effector 32. At 99, a forming membrane 60 is placed over the composite ply 24 on the tool surface 30 using the end effector 32. At 101, a section of the forming membrane and the composite ply 24 are clamped against the contoured tool surface 30. Then, at 103, the composite ply 24 is formed down over the contoured tool surface 30 while the section of the composite ply 24 remains clamped against the tool surface 30. During forming, the composite ply 24 is allowed to slip relative to the gripping cups 54.

Figure 15:
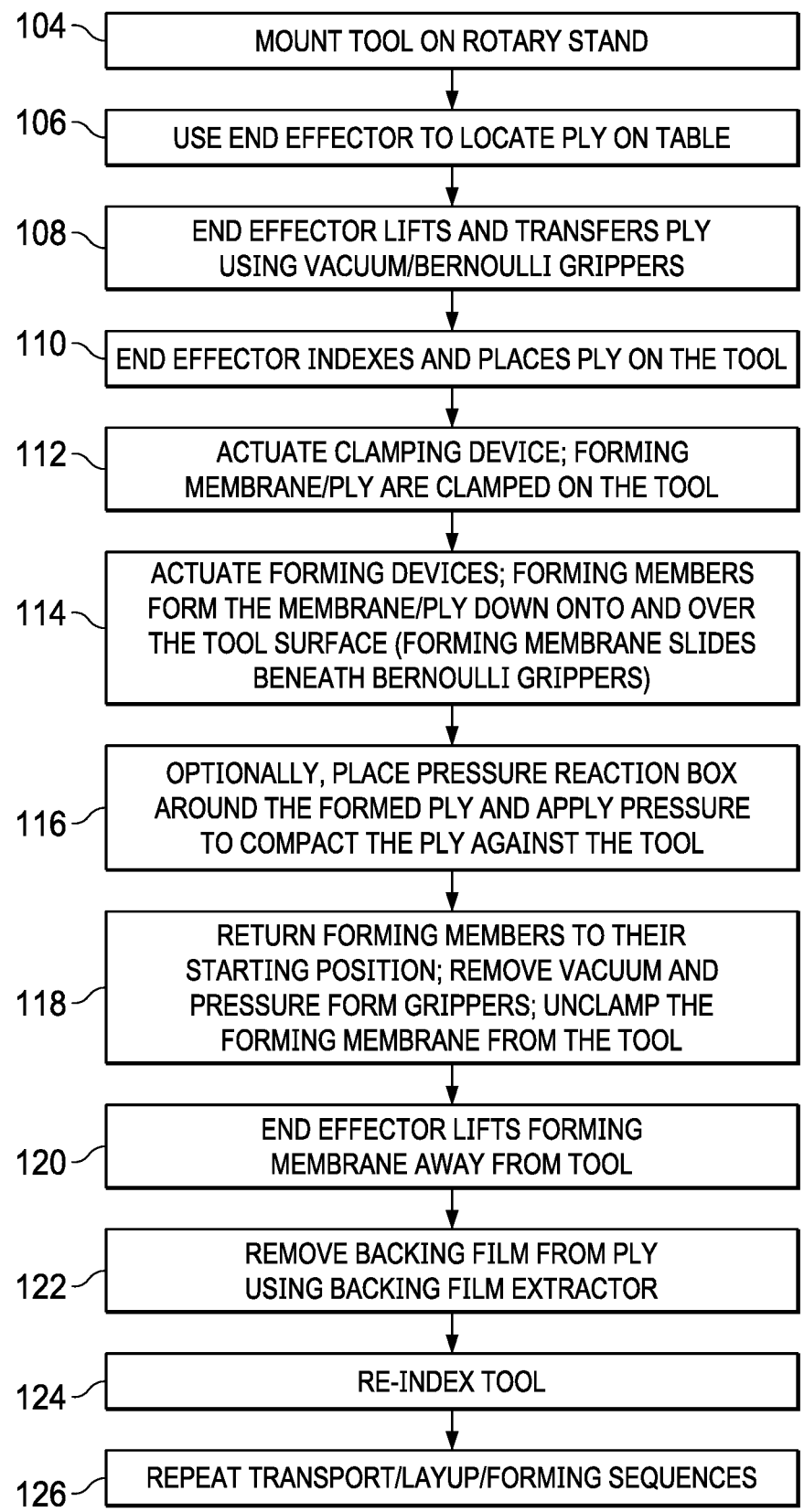
FIG. 15 is an illustration of a flow diagram of an alternate method of placing and forming composite plies on the tool.

FIG. 15 broadly illustrates the steps of an alternate method of transporting and forming composite plies 24 on a complex tool surface 30. Beginning at 104, a tool 28 is mounted on a rotary stand 29 or similar support. At 106, an end effector 32 is used to locate a composite ply 24 on the table 26 or at another location. At 108, the end effector 32 is used to lift and transfer the composite ply 24 using a combination of vacuum and Bernoulli grippers 52, 54. At 110, the end effector 32 is used to index and place the composite ply 24 on the tool 28. At 112, a clamping device 57 is actuated which clamps the forming membrane 60 and the composite ply 24 on the tool 28. At 114, the forming devices 55 are actuated, causing forming members 80 to form the forming membrane 60 and composite ply 24 down onto and over the tool surface 30. As the plies 24 are being formed, the forming membrane 60 and composite ply 24 are allowed to slide beneath Bernoulli grippers 54. Optionally, at 116, a pressure reaction box 90 is placed around the formed composite ply 24 and pressure is applied within the pressure reaction box 90 which compacts the composite ply 24 against the tool 28. At 118, the forming members 80 are returned to their starting position, vacuum and pressure are removed from the grippers 52, 54, and the forming membrane 60 is unclamped from the tool 28. At 120, the end effector 32 lifts the forming membrane 60 away from the tool 28. At 122 a backing film is removed from the composite ply 24 using a backing film extractor or a similar device. At 124, the tool 28 is re-indexed in preparation for forming another composite ply 24. At 126, the steps of laying up and forming plies 24 are repeated.

Figure 16:
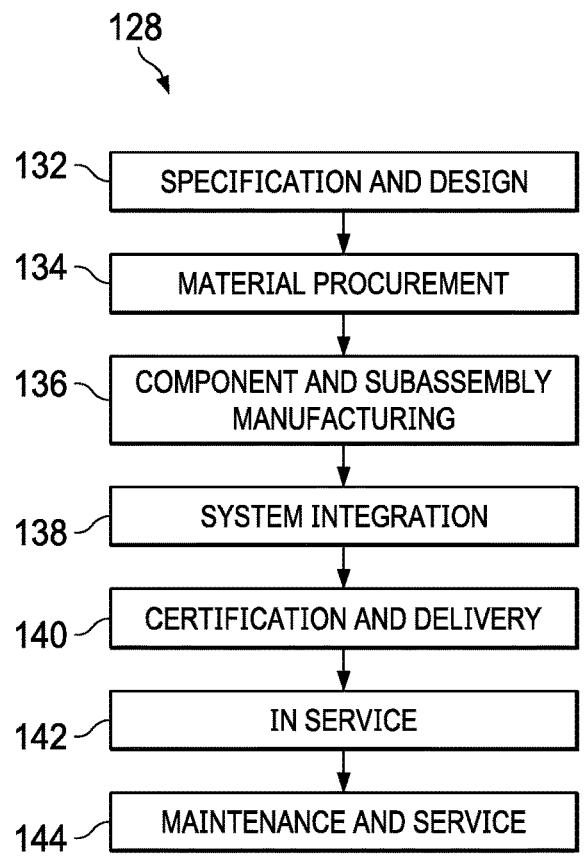
FIG. 16 is an illustration of a flow diagram of aircraft production and service methodology.
Figure 17:
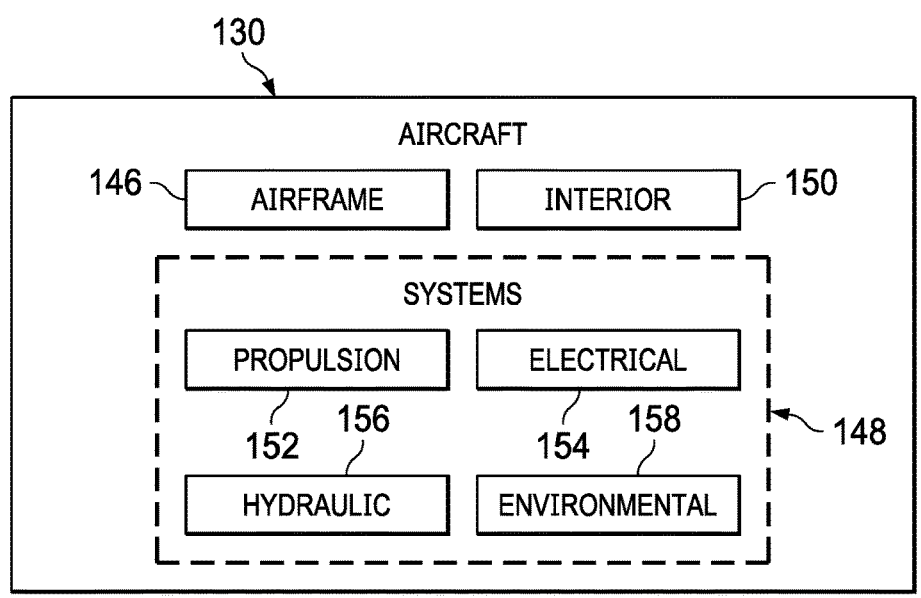
FIG. 17 is an illustration of a block diagram of an aircraft.

Embodiments of the disclosure may find use in a variety of potential applications, particularly in the transportation industry, including for example, aerospace, marine, automotive applications and other application where pressurized fluid tubes, such as fuel systems and hydraulic systems in aircraft, may be used. Thus, referring now to FIGS. 16 and 17, embodiments of the disclosure may be used in the context of an aircraft manufacturing and service method 128 as shown in FIG. 16 and an aircraft 130 as shown in FIG. 17. Aircraft applications of the disclosed embodiments may include, for example, without limitation, composite structures having complex features and surfaces. During pre-production, exemplary method 128 may include specification and design 132 of the aircraft 130 and material procurement 134. During production, component and subassembly manufacturing 136 and system integration 138 of the aircraft 130 takes place. Thereafter, the aircraft 130 may go through certification and delivery 140 in order to be placed in service 142. While in service by a customer, the aircraft 130 is scheduled for routine maintenance and service 144, which may also include modification, reconfiguration, refurbishment, and so on.

Each of the processes of method 128 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 130 produced by exemplary method 128 may include an airframe 146 with a plurality of systems 148 and an interior 150. Examples of high-level systems 148 include one or more of a propulsion system 152, an electrical system 154, a hydraulic system 156 and an environmental system 158. Any number of other systems may be included. Although an aerospace example is shown, the principles of the disclosure may be applied to other industries, such as the marine and automotive industries.

Systems and methods embodied herein may be employed during any one or more of the stages of the production and service method 128. For example, components or subassemblies corresponding to production process 136 may be fabricated or manufactured in a manner similar to components or subassemblies produced while the aircraft 130 is in service. Also, one or more apparatus embodiments, method embodiments, or a combination thereof may be utilized during the production stages 136 and 138, for example, by substantially expediting assembly of or reducing the cost of an aircraft 130. Similarly, one or more of apparatus embodiments, method embodiments, or a combination thereof may be utilized while the aircraft 130 is in service, for example and without limitation, to maintenance and service 144.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An end effector for transporting and forming a composite ply onto a contoured tool surface, comprising:
   a forming membrane configured to be placed over the composite ply;
   a vacuum gripper configured to grip the composite ply to hold the composite ply against a first face of the forming membrane, wherein the vacuum gripper is located substantially along a centerline of the forming membrane to fix a location of a portion of the composite ply on the forming membrane;
   a plurality of Bernoulli grippers configured to grip the composite ply while allowing the composite ply to slip relative to the plurality of Bernoulli grippers, the plurality of Bernoulli grippers positioned to allow edges of the composite ply to slip relative to the forming membrane; and
   a forming device comprising an extendable arm with a forming member at its outer extremity, the forming member engageable with a second face of the forming membrane for forming the forming membrane and the composite ply down onto the contoured tool surface, wherein the second face is opposite the first face.

2. The end effector of claim 1, wherein the vacuum gripper and the plurality of Bernoulli grippers are each attached to the forming membrane.

3. The end effector of claim 1, wherein the vacuum gripper and plurality of Bernoulli grippers are each recessed within the forming membrane such that they are flush with a surface of the composite ply.

4. The end effector of claim 1, wherein:
the vacuum gripper is a suction cup configured to be coupled with a vacuum source, and
the plurality of Bernoulli grippers is a plurality of Bernoulli cups, each configured to be coupled with a source of air pressure.

5. The end effector of claim 1, further comprising:
at least one clamping device configured to clamp a section of the forming membrane and the composite ply against the contoured tool surface and thereby maintain a position of the composite ply on the contoured tool surface during the forming.

6. The end effector of claim 1, wherein the forming device includes:
a linear actuator having the extendable arm, and
wherein the forming member on the extendable arm is attached to the forming membrane in order to form the forming membrane and composite ply down onto and over the contoured tool surface.

7. The end effector of claim 1,
wherein the plurality of Bernoulli grippers is spaced apart from each other across and attached to the forming membrane, each Bernoulli gripper of the plurality of Bernoulli grippers being configured to be coupled with a pressure source, and the end effector further comprising: a plurality of forming devices, wherein the forming device is one of a plurality of forming devices, wherein the forming member is one of a plurality of forming members of the plurality of forming devices, each of the plurality of forming devices spaced apart from each other, each of the forming devices including a respective extendable arm of the plurality of extendable arms having a respective forming member of the plurality of forming members configured to engage the second face of the forming membrane, and wherein the respective forming member of each of the plurality of forming devices is attached to the forming membrane in order to form the forming membrane and composite ply onto and over across the contoured tool surface.

8. An apparatus for placing and forming a composite ply onto a contoured tool surface, comprising:
a manipulator;
a frame mounted on and transportable by the manipulator;
a flexible forming membrane supported by the frame and configured to be placed over the contoured tool surface;
at least one vacuum suction cup mounted on the flexible forming membrane and configured to engage and grip the composite ply, wherein the at least one vacuum suction cup is located substantially along a centerline of the flexible forming membrane to fix a location of a portion of the composite ply on the flexible forming membrane;
a clamping device supported by the frame and configured to clamp a section of the flexible forming membrane and the composite ply on the contoured tool surface;
a plurality of Bernoulli cups mounted on the flexible forming membrane and configured to grip the composite ply while allowing the composite ply to slip there beneath during forming of the composite ply onto the contoured tool surface, the plurality of Bernoulli cups positioned to allow edges of the composite ply to slip relative to the flexible forming membrane; and a plurality of forming devices mounted on the frame and configured to form the flexible forming membrane and the composite ply down onto the contoured tool surface by extending an extendable arm of each of the plurality of forming devices.

9. The apparatus of claim 8, wherein:
each forming device of the plurality of forming devices includes an actuator having the extendable arm, and a forming member at an outer extremity of the extendable arm, wherein the forming member is attached to a second face of the flexible forming membrane to selectively stretch the flexible forming membrane by extending the extendable arm, wherein the second face is opposite a first face of the flexible forming membrane configured to contact the composite ply.

10. The apparatus of claim 8, wherein the flexible forming membrane includes structure providing the flexible forming membrane with locally tailored stiffness.

11. The apparatus of claim 10, wherein the structure includes at least one of:
batons integrated into the flexible forming membrane, and
splines integrated into the flexible forming membrane.

12. The apparatus of claim 8, further comprising:
a pressure reaction box configured to enclose the flexible forming membrane and the contoured tool surface, the pressure reaction box being coupled with a vacuum source for compacting composite ply against the contoured tool surface.

13. The apparatus of claim 12, wherein the pressure reaction box is mounted on the frame.

14. A method of transporting and forming a composite ply onto a contoured tool surface, comprising: gripping the composite ply using a plurality of gripping cups of an end effector, the plurality of gripping cups comprising at least one vacuum gripper a plurality of Bernoulli grippers, the end effector configured to be coupled with a manipulator, the plurality of gripping cups attached to a forming membrane of the end effector, wherein the vacuum gripper is located substantially along a centerline of the forming membrane to fix a location of a portion of the composite ply on the forming membrane, the plurality of Bernoulli gripper positioned to allow edges of the composite ply to slip relative to the forming membrane; transporting the composite ply to the contoured tool surface using the end effector; placing the composite ply on a contoured tool surface using the end effector such that the composite ply is positioned between a first face of the forming membrane and the contoured tool surface; clamping a section of the forming membrane and the composite ply against the contoured tool surface; and forming the composite ply down over the contoured tool surface while the section of the composite ply remains clamped against contoured tool surface, including allowing the composite ply to slip relative to the plurality of Bernoulli grippers as the composite ply is being formed down over the contoured tool surface by a forming device of the end effector, the forming device comprising an extendable arm with a forming member at its outer extremity, the forming device engageable with a second face of the forming membrane, wherein the second face is opposite the first face.

15. The apparatus of claim 8, wherein the frame is an adjustable frame including a backbone and a pair of laterally spaced cross members mounted on the backbone.

16. The end effector of claim 7, wherein the plurality of Bernoulli grippers is located along opposite edges of the forming membrane.

17. The apparatus of claim 15, further comprising:
a number of motors configured to adjust a linear position of the backbone on the manipulator; and a plurality of motors configured to adjust lateral positions of the cross members relative to the backbone.

18. The end effector of claim 1,
wherein the forming membrane is configured to stretch during forming, and further comprising: a plurality of forming devices, wherein the forming device is one of a plurality of forming devices, wherein the forming member is one of a plurality of forming members of the plurality of forming devices, each of the plurality of forming devices spaced apart from each other, each of the plurality of forming devices comprising a respective extendable arm of the plurality of extendable arms, having a respective forming member of the plurality of forming members configured to engage the second face of the forming membrane, and wherein each of the plurality of forming devices is configured to selectively stretch the forming membrane by extending the respective extendable arm while the respective forming member is in contact with the second face.

19. The end effector of claim 5, wherein the clamping device is attached to the vacuum gripper such that the vacuum gripper is used to clamp the forming membrane against the contoured tool surface.

20. The method of claim 14, wherein the end effector further comprises a pressure reaction box configured to enclose the forming membrane and the contoured tool surface, the method further comprising:
compacting the composite ply against the contoured tool surface by applying a vacuum from a vacuum source to the pressure reaction box coupled to the vacuum source.

* * * * *